United States Patent
Linnebur et al.

(10) Patent No.: US 6,986,314 B2
(45) Date of Patent: Jan. 17, 2006

(54) AIR SEEDER ATTACHMENT FOR A V-BLADE PLOW

(75) Inventors: Mark Anthony Linnebur, Byers, CO (US); Lloyd Hubert Linnebur, Jr., Byers, CO (US)

(73) Assignee: Mark Linnebur, Byers, CO (US)

( * ) Notice: Subject to any disclaimer, the term of this patent is extended or adjusted under 35 U.S.C. 154(b) by 102 days.

(21) Appl. No.: 10/764,911

(22) Filed: Jan. 26, 2004

(65) Prior Publication Data

US 2005/0160954 A1   Jul. 28, 2005

(51) Int. Cl.
   *A01C 7/00*   (2006.01)
(52) U.S. Cl. .................. 111/186; 111/152; 172/722; 172/772.5; 172/733
(58) Field of Classification Search ............... 111/186, 111/187, 188, 195, 152; 172/721, 722, 724, 172/726, 728, 730, 733, 772.5, 769
   See application file for complete search history.

(56) References Cited

U.S. PATENT DOCUMENTS

| | | | |
|---|---|---|---|
| 1,645,507 A | | 10/1927 | Moyer et al. |
| 2,889,788 A | | 6/1959 | Van Dorn |
| 3,854,429 A | | 12/1974 | Blair |
| 3,895,589 A | * | 7/1975 | Garner et al. ............... 111/186 |
| 4,388,878 A | * | 6/1983 | Demzin ..................... 111/186 |
| 4,445,445 A | | 5/1984 | Sterrett |
| 4,607,581 A | * | 8/1986 | Kopecky .................... 111/152 |
| 4,770,112 A | * | 9/1988 | Neumeyer ................... 111/73 |
| 5,025,736 A | * | 6/1991 | Anderson ................... 111/152 |
| 5,136,954 A | * | 8/1992 | Fetaz et al. ................ 111/123 |
| 5,495,814 A | * | 3/1996 | Primus ...................... 111/124 |
| 5,906,166 A | * | 5/1999 | Wagner ..................... 111/170 |

FOREIGN PATENT DOCUMENTS

EP   291 901 A1  *  11/1988

OTHER PUBLICATIONS

Flex King Manufacturing-see Remarks.

* cited by examiner

*Primary Examiner*—Victor Batson

(57) ABSTRACT

This invention is an apparatus for planting seed and injecting dry fertilizer (dry granular material) with a V-Blade Plow while at the same time tilling the soil. The apparatus consists of a series of circular conveyance tubes that direct the granular material into a groove formed by the apparatus by means of a knife mounted to the underside of a metal plate which also serves as the mounting structure. The seed and fertilizer are injected into the groove, below the compacted sweep layer (formed by the blade) and next to firm soil that does not dry out like the loose soil above the sweep layer.

1 Claim, 4 Drawing Sheets

AIR SEEDER ATTACHMENT FOR A V-BLADE PLOW

CROSS REFERENCE TO RELATED APPLICATIONS

Not applicable

BACKGROUND

1. Field of Invention

This invention relates to an agricultural implement for planting seed and injecting dry fertilizer (dry granular material) with a V-Blade Plow while at the same time tilling the soil.

2. Discussion of Prior Art

In the 1980's an air seeder attachment was made by the Flex-King Corporation for a V-Blade Plow. The attachment was a series of metal tubes conformed to be protected by the "Frog" of the V-Blade, which deposited the seed under ground in regularly spaced transverse rows. This attachment was discontinued by Flex-King and is currently not produced by any other manufactures. There are independent shops that can make replacement parts for this attachment. However, a thorough patent search could not locate this attachment. After talking with the manufacturer and the actual technician who did the manufacturing, it does not appear that a patent was ever sought.

The seed and dry fertilizer originate from the "Air Seeder" tank by means of the air pump, or fan, and are blown through plastic and/or metal tubes to a series of metal circular tubes (refered to above) which deposited the seed underground. The disadvantages to this setup was that it deposited the seed on a compacted layer of soil (sweep layer) formed by the blade of the V-Blade Plow unit leaving loose soil above the seed. The soil above the sweep layer subsequently dries out and does not give good seed to soil contact. It then becomes necessary for a rain shower to provide the good seed to soil contact for the seed to sprout and come up. However, this contains risks in that the rain may also form a crust on the top of the soil which inhibits the sprout from penetrating the soil and emerging. The attachment also didn't solve the problem of the hard sweep layer which inhibits the roots from propagating downward.

SUMMARY

The invention is an apparatus that attaches to the "Frog" 22 (the wing portion, or V, eminating from the vertical shank 21) of a common V-Blade Plow unit 20, as shown in FIG. 1. The apparatus is used in conduction with the other components necessary for an "Air Seeder" which include the seed and fertilizer (granular material) storage tank; the air pump, or fan, that blows the granular material through plastic and/or metal ducting.

The Air Seeder Attachment is comprised of: a) a series of circular conveyance tubes 30 that transport and direct the seed and dry fertilizer into the soil; b) replacable nozzles 43 that attach to the exit of each circular conveyance tube; c) a metal plate 40 that mounts the apparatus to the "Frog" 22; d) a series of replacable knives 42 that penetrate the soil (more specifically the compacted layer or sweep layer) which provide grooves in the soil, which become a suitable bed for seed to be deposited into; and e) and a series of mounting tabs 41 attached to the underside of the metal plate 40 that the knives 42 are mounted to.

The circular tubes 30 are conformed such that the shank 21, "Frog" 22 and blade 23 go through the untilled soil first, thereby, protecting them from extraordinary wear and abrasion. They are also conformed at the end of the tube, where the granular material exits the apparatus such that the seed is propelled vertically downward into the grooves created by the knives.

OBJECTS AND ADVANTAGES

The Air Seeder Attachment for a V-Blade Plow allows one to plant a crop with precision and in an ideal seed bed, while at the same time tilling the ground at planting time, all in one operation.

Modern farming techniques have changed in recent times and are as varied in farming as they are in about any profession. New conservation tillage techniques have come along which include "Minimum-Till" or "No-Till" along with conventional tilling techniques. Conventional tilling techniques include methods of killing weeds or aerating the soil with the use of equipment such as the molbord plow, disc, chisel, and more recently a large V-Blade Plow or Sweep Plow.

The V-Blade Plow consists of several individual V-Blade Plow units 20 mounted in a staggered side by side arrangement. They usually range from three individual units to as many as fifteen units or more attached to an overall, flexible frame pulled along by means of an agricultural tractor.

The large blade V-Blade Plow has become more popular in conventional and "minimum-till" farming practices because it does not destroy or bury the remaining portion of the previous crop (residue) like other farming equipment does. This residue acts as a mulch and prevents evaporation from the soil and also helps hold the soil together which prevents erosion due to wind or rain. The practice of leaving as much residue as practically and economically possible has led to what is known as conservation tillage.

Among farmers who use conservation tillage practices, the V-Blade Plow is often used near the end of the year's operations prior to planting because the cost of applying chemical has come to the point where high, additional expenses cannot be justified but unwanted weeds or grasses must still be controlled. Even though this is less expensive than chemical means, it still requires an additional operation over the ground requiring additional labor or longer hours in the field. And there are drawbacks to using the V-Blade Plow prior to planting. It forms a hard, compacted, flat surface at the point of the blade as it slices through the soil, called a sweep layer which inhibits root growth of the crop that is planted if it isn't penetrated by the planting equipment. Also, the soil above the tillage depth or sweep layer was left loose and aerated which allowed that portion of the soil to dry out leaving less than ideal planting conditions, if not planted within just a few days.

Modern farming equipment has also changed, particularly planting equipment. Small grains are more and more being planted with "Air Seeders". The air seeder utilizes the conventional tilling unit (which include a shank and point or a planter unit which include opener discs, both of which penetrate the soil for the placement of seed) along with a storage tank that meters the seed and fertilizer, an air pump or fan that blows and distributes the seed and fertilizer through a manifold system that directs the seed to the conventional tilling unit, described earlier. These tilling units are usually spaced from 6 to 30 inches apart forming parallel rows in the field. For example, the crop may be planted on 12 inch rows or 12 inch spacings.

If only these last two operations could be combined?

The combination of the last tillage operation and planting have been combined before. An attachment was produced in the 1980's that did what I just described with a series of metal tubes attached to the "Frog" (the wing portion or V) of the V-Blade Plow unit. As the V-Blade Plow was pulled through the soil the air seeder distributed the grain and fertilizer in rows. However, the grain was deposited on top of the compacted sweep layer with loose soil above it, which would probably dry out soon, as discussed above. The seed was left with inadequate seed to soil contact and therefore it usually didn't sprout. However, the seed usually would sprout after the first significant moisture. Unfortunately, if the rain was intense, it would crust the top of the soil inhibiting the sprout from emerging. These planting conditions were found to be inadequate and unreliable and the attachment was discontinued. Federal Crop Insurance even quit covering crops that were planted in this way.

This present invention solves the problems described above. The Air Seeder V-Blade Plow Attachment is designed to break through the sweep layer leaving a groove as the seed bed. The seed is injected into the groove, below the compacted sweep layer, where the roots can propogate down more easily. The seed is also next to the firm moist soil that does not readily dry out. In fact, any dry soil that may have fallen in the groove is moistened by the adjacent moisture of the firm soil. Over two thousand five hundred acres were planted last year (2003) with excellent results.

The Air Seeder V-Blade Plow Attachment was also designed with varying soil conditions and ease of maintenance in mind. Therefore, the replacable knives 42 and nozzles 43 are easiliy interchangeable.

It is, therefore, the principle object of this invention to provide an effective way of combining the last tillage operation prior to planting and the planting operation. This will be a significant cost and labor savings for the farmer as well as providing another option to the conservation tillage package of methods.

Another objective of this invention is to convey dry fertilizer along with the seed for incorporation into the soil during the planting operation.

Another objective of this invention is to not interfere with the tilling process for the purpose of killing unwanted weeds or grasses.

Another objective of this invention is to be able to mount to varying styles and sizes of V-Blade Plow units.

Another objective of this invention is to provide varying distances between the rows (row spacings) ranging from seven and one half (7½) inches to as much as thirty (30) inches.

Other objects will be in part apparent and in part pointed out specifically herinafter in connection with the description of the drawings that follow.

LIST OF REFERENCE NUMERALS

Figure 1:
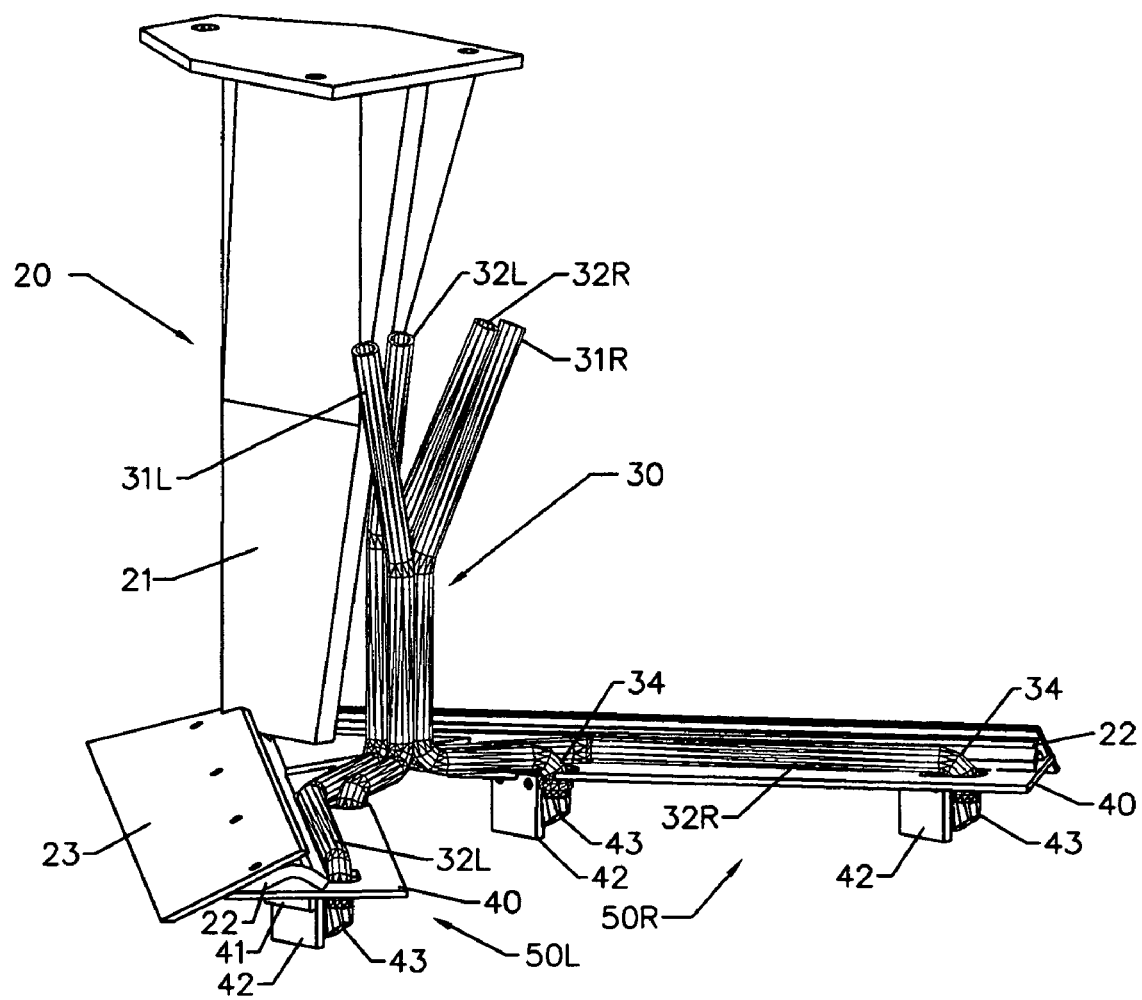
FIG. 1 is an isometric view in an upright position showing a V-Blade Plow unit and the blade along with the left and right Air Seeder V-Blade Plow Attachments.

20 V-Blade Plow unit
21 shank
22 Frog
23 blade
30 Circular Conveyance Tubes
31R shorter circular conveyance tube (right)
31L shorter circular conveyance tube (left)
32R longer circular conveyance tube (right)
32L longer circular conveyance tube (left)
34 downturned elbow
40 metal plate
41 mounting tab
42 knife
43 nozzle
44 opening in metal plate for conveyance tube's downturned elbow
45 mounting holes in plate
50R Air Seeder V-Blade Plow Attachment (right)
50L Air Seeder V-Blade Plow Attachment (left)

DESCRIPTION OF INVENTION

Figure 2:
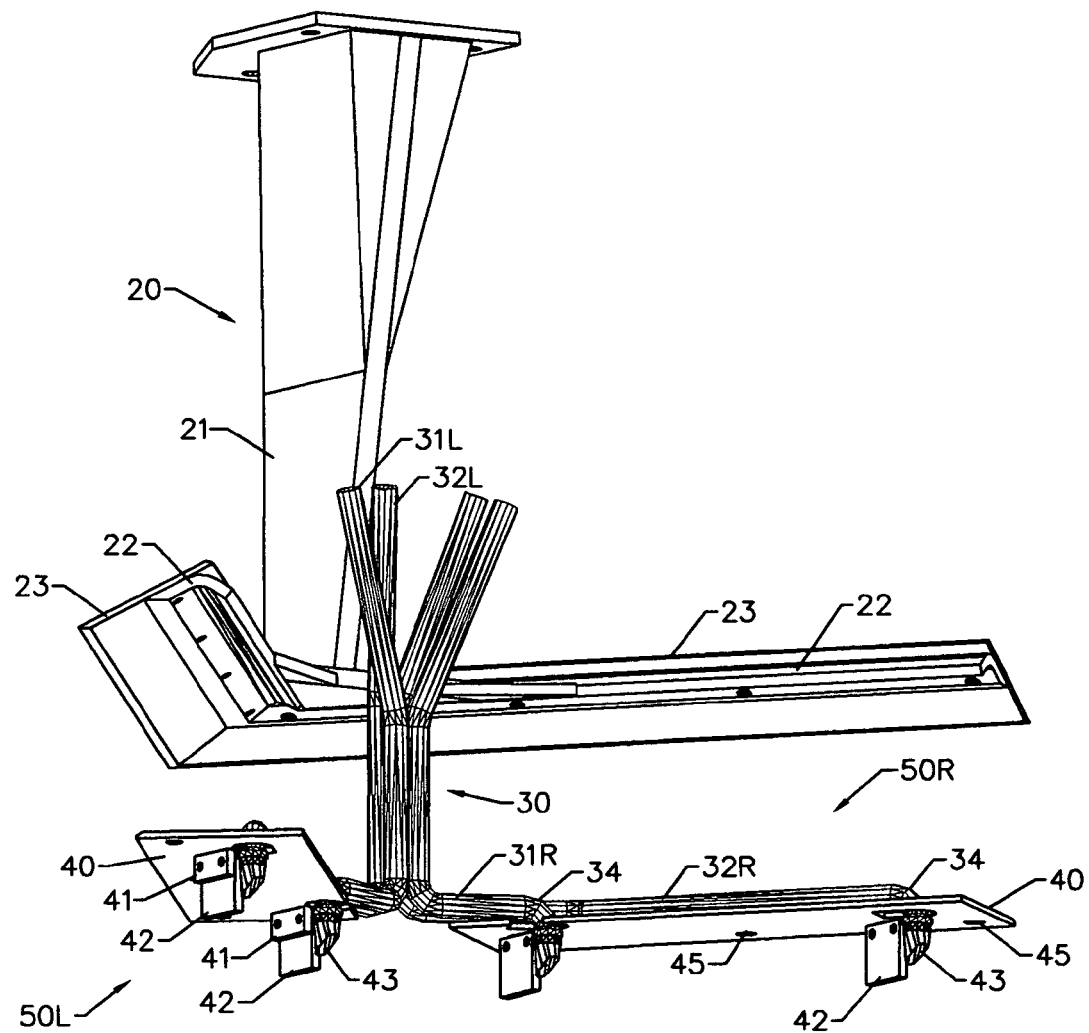
FIG. 2 is an isometric view of the underside showing a V-Blade Plow unit and blade along with the left and right attachments separated from the plow unit to highlight invention.
Figure 3:
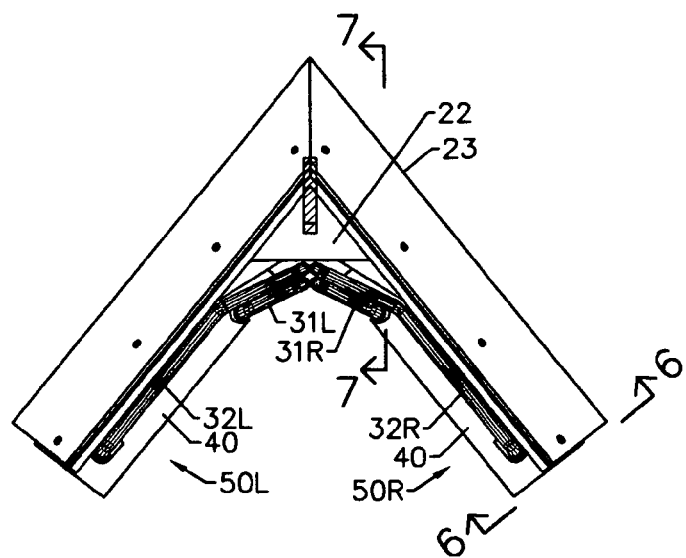
FIG. 3 is a section taken along line 3—3 of FIG. 4.
Figure 4:
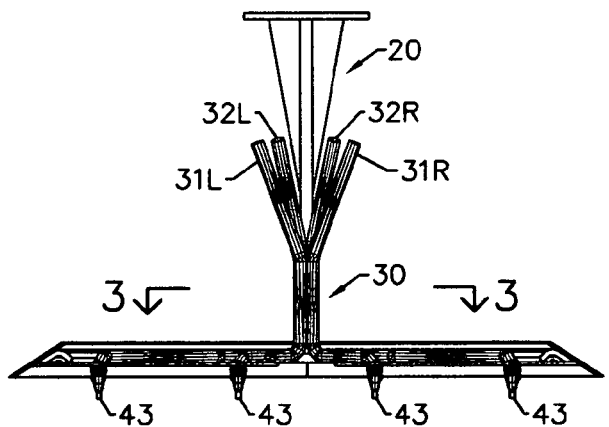
FIG. 4 is a rear elevation view of the attachment.
Figure 5:
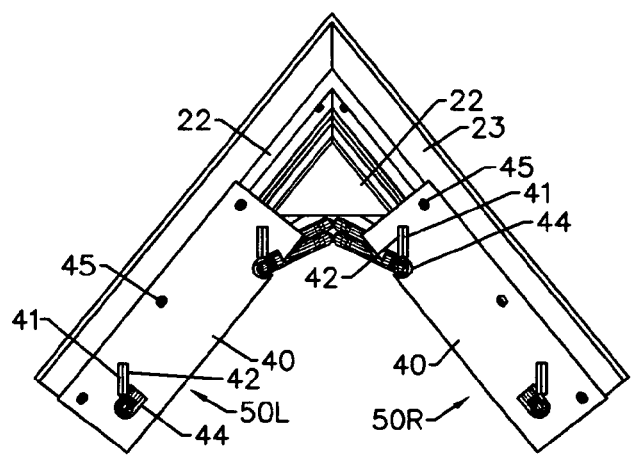
FIG. 5 is a bottom plan view of the attachment.
Figure 6:
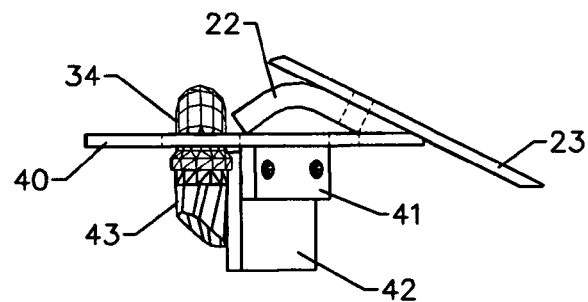
FIG. 6 is a fragmentary end section view to a greatly enlarged scale along the line 6—6 of FIG. 3.
Figure 7:
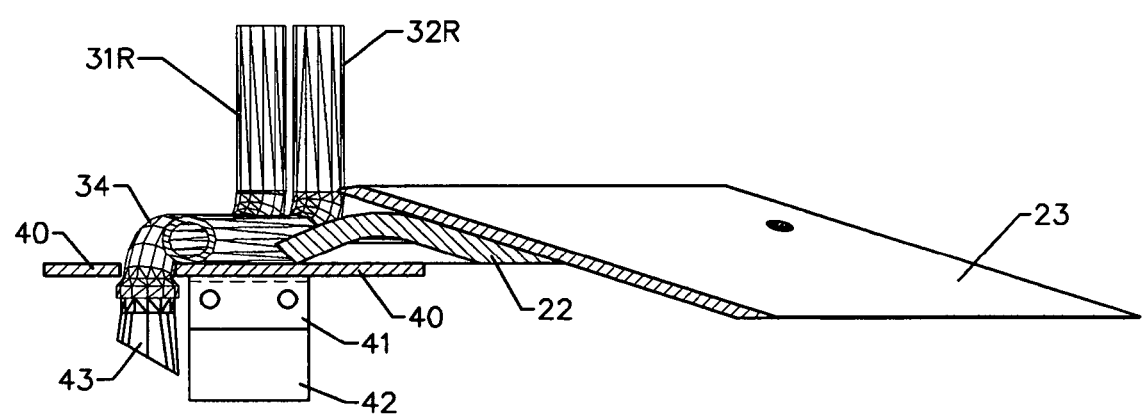
FIG. 7 is a fragmentary section view to a greatly enlarged scale along the line 7—7 of FIG. 3.

Referring now to the drawings for a detailed description of the invention, reference numeral 20 broadly identifies a conventional and commercially available V-Blade Plow unit (which includes the vertical shank 21 and horizontal "Frog" 22), as shown best in FIGS. 1 and 2. These units may be of varying styles and sizes. The "Frog" is configured such that it has a downwardly inclined angled flange on the leading edge, as shown in FIGS. 6 and 7. Bolted to the downwardly inclined angled flange of the "Frog", are plow blades 23 ending in sharpened leading edges. These blades are suitably beveled and joined together at their front ends so as to define an acute angle, or V. The vertically oriented mounting assembly, or shank, is used to mount the individual unit 20 onto the frame of the overall V-Blade Plow, or Sweep Plow, consisting of several units in a staggered side by side arrangement, which in turn is pulled along by an agricultural tractor, which has not been illustrated.

The novel aspects of the Air Seeder V-Blade Plow Attachment does not lie with the V-Blade Plow unit 20, but rather, in the attachment itself, indicated broadly by the numeral 50, consisting of a left and right attachment 50L, 50R. In the particular form shown, it can be seen that a set of two circular conveyance tubes 30, arranged, first vertically downward behind the vertical shank 21, then conformed in a horizontally oriented, side by side fashion along the trailing edge of each wing of the "Frog" 22, as shown in FIGS. 1 through 7. As can be seen, one of the tubes is much longer than the other, terminating sooner such that the granular material is distributed at exact distances (or spacing) apart from each other. The conveyance tubes 30 are fixed to each other and to the metal plate 40, which serves as the mounting bracket and support structure for the mounting tab 41 and replaceable knife 42 assemblies. At the end of each conveyance tube, after the downturned elbow 34, a replacable nozzle 43 is attached that directs the granular material precisely downward into the groove of the soil formed by the knife 42.

The set of circular conveyance tubes 30 are conformed in such a way as to be protected by the vertical shank 21 and the horizontal "Frog" 22. When in use, the upper part of each circular conveyance tube is connected to plastic tubing (which leads from the air seeding components, which are not shown). The vertically oriented portion of the conveyance tubes are slightly bent at the top so as to give room between each conveyance tube in order to connect the plastic tubing. As each individual conveyance tube proceeds downward, it makes a 90 degree bend 33 then proceeds horizontally and follows behind the "Frog" 22 portion of the unit. The shorter conveyance tube 31L or 31R then makes another 90 degree turn downward 34, through the metal plate 40 and more precisely, through the openings in the metal plate 44. The end of the conveyance tube, after the 90 degree turn 34, is configured such that a nozzle 43 can be attached, that precisely directs the granular material into the groove formed by the knife 42. The longer conveyance tube 32L or 32R is adjacent to, and extends beyond the shorter conveyance tube and makes a slight bend to conform to the shape of the "Frog" and then also makes the 90 degree turn downward 34, through another opening in the metal plate 44. As with the shorter tube, a nozzle 43 is attached at the end.

The metal plate 40 has several holes 45, nominally ½", along the leading edge of the plate that attaches the apparatus 50L, 50R to the "Frog" 22. These are the same bolts used to bolt the blade 23 to the "Frog". However, the bolts may need to be longer such that they extend through the metal plate sufficiently to get a nut on the end. The plate is also shown with relatively large holes openings 44 (approximately 1½" wide by 2½" long) such that the downturn elbow in the conveyance tubes 34 goes through them in order to direct the seed vertically downward.

The mounting tabs 41 are attached to the underside of the metal plate 40. They serve the purpose of attaching the knife 42, which penetrates the compacted sweep layer and forms the groove for which the granular material is deposited. The tabs are located in front of the nozzle 43 (or end of the downturned elbow of the conveyance tubes 34) and are oriented parallel to the direction of travel. They are shown to have two holes where the knife is attached. However, other mounting schemes may be used for the knife.

The knife 42 attaches onto the mounting tabs 41. They are shown to be rectangular and approximately ⅜" wide by 2½" from front to back and extending approximately 3½" downward. These dimensions may vary. Especially if differing depths of groove are required under varying soil conditions. The shape of the knife may also vary having possible trapezoidal shapes or curved shapes. The knives are replacable since the they are under very abrasive conditions when penetrating the compacted sweep layer.

The nozzle 43 attaches to the exit of each of the circular conveyance tubes 31L, 31R, 32L, 32R. The nozzle transitions from a circular cross section (where it attaches) to an elongated, elliptical shape at the end where the granular material finally exits the nozzle. The nozzle is also tapered from the directly behind the knife 42 upward to the trailing edge of the nozzle, as shown in FIG. 7. This configuration prevents soil from jamming up into the exit of the nozzle.

OPERATION OF INVENTION

The V-Blade Plow is comprised of several individual V-Blade Plow units 20 mounted in a staggered side by side arrangement. As the Sweep Plow is pulled along by means of an agricultural tractor the depth of the plow (the depth of the blade) is controlled by the operator. When functioning, the V-Blade Plow unit 20 along with the blade 23 runs under the surface of the ground slicing underneath several inches of soil which also slices off the roots of unwanted weeds or grasses as well as loosening the soil from around those same roots. The soil above the level of the blade flows over the blade 23 and then over the Air Seeder V-Blade Plow Attachment 50L, 50R. What is left is a layer of loose aerated soil above the level that the blade was set at. Below the level of the blade is left a compacted layer of soil (sweep layer), which is a fraction of an inch thick, as well as undisturbed, firm soil. The Air Seeder V-Blade Plow Attachment runs in conjunction with the plow, so as the V-Blade Plow unit and blade slice forward through the soil, the knives 42 are penetrating the sweep layer and forming grooves from one inch to several inches deep. As a result, several regularly spaced transverse rows are formed per unit 20. With the embodiment shown, there are four rows per plow unit 20.

The air seeder components operate as follows. The storage tank holds the granular material (including seed and dry fertilizer). As the entire machinery is pulled forward by means of an agricultural tractor the granular material is metered out into a manifold system which has pressurized air flowing through it by means of an air pump, or fan. As the granular material is metered, it is caught in the air flow stream and travels through a network of plastic and metal ducting to another manifold where the granular material is dispersed further to individual plastic tubing which lead to each of the the circular conveyance tubes 31L, 31R, 32L, 32R, as part of the present invention 50. The granular material then travels through the conveyance tubes finally exiting in a vertically downward direction, being injected into the groove formed by the knife 42.

As with most planter or air seeder machinery, a series of presswheels (one presswheel per transverse row), not shown, are attached to and precisely follow the transverse rows formed by the attachments 50L, 50R in order to compact soil around the seed to provide good seed to soil contact. Which in turn, if the soil is moist, allows the seed to sprout.

Conclusion, Ramifications, and Scope of Invention

As one can imagine, this invention may very well be a great cost savings to many farmers who have incorporated the V-Blade Plow as part of their farming operation. The "Air Seeder V-Blade Plow Attachment" provides a proven way of planting wheat and applying dry fertilizer in one pass, while at the same time doing the last operation over the field to kill any unwanted weeds or grasses. It saves labor, tractor time and expenses and the cost of purchasing additional planting equipment. This idea of combining operations in the field has been tried in many ways but it has never really caught on for planting, especially within a conservation tillage operation. This invention will give many farming operations those very means.

While the above description and figures describe a certain embodiment, mainly that there are a total of two attachment with a total four conveyance tubes per V-Blade Plow unit, this should not be construed that more or less conveyance tubes per unit cannot be utilized and should not be construed as limitations on the scope of the invention. For example, on a six foot wide V-Blade Plow unit, three conveyance tubes per attachment would probably be the preferred embodiment.

Accordingly, the scope of the invention should be determined not by the embodiment illustrated, but by the appended claims and their legal equivalent.

What is claimed is:

1. A V-blade plow for use with an air seeder distribution system used for injecting dry granular material vertically downward into grooves formed in the ground comprising;
   a. downwardly, forwardly inclined and angularly disposed wing blades with leading edges for plowing, and elevated trailing edges,
   b. a plurality of circular tubes, attached adjacent to each other, having inlets connectable to a source of granular material transported by means of pressurized air, said plurality of circular tubes conform to said V-blade plow and terminate at varying distances along said wing blades with outlets positioned such that the granular material is directed downward and
   c. a metal plate configured to provide structural support and a means of mounting said plurality of circular tubes to said V-blade plow
   d. a plurality of replaceable knives mounted to an underside of said metal plate by direct connection to mounting tabs, said mounting tabs directly attached to the underside of said metal plate and positioned directly in front of the tube outlets, said knives configured to penetrate a compacted layer formed by the wing blades, and to form said groove below said compacted layer and,
   e. a plurality of replaceable nozzles, each said nozzle attached directly to a tube outlet, and configured for granular material injection and to prevent soil from jamming up into said nozzles.

* * * * *